June 10, 1958 W. T. CLARY, JR 2,838,687
NONLINEAR RESONANT CIRCUIT DEVICES
Filed Aug. 9, 1955 3 Sheets-Sheet 1

INVENTOR
W. T. CLARY, JR.
BY
H. O. Wright
ATTORNEY

June 10, 1958 W. T. CLARY, JR 2,838,687
NONLINEAR RESONANT CIRCUIT DEVICES
Filed Aug. 9, 1955 3 Sheets-Sheet 2
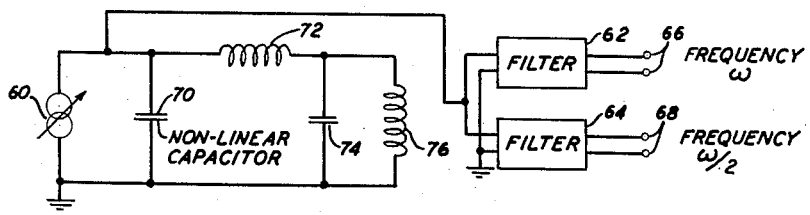
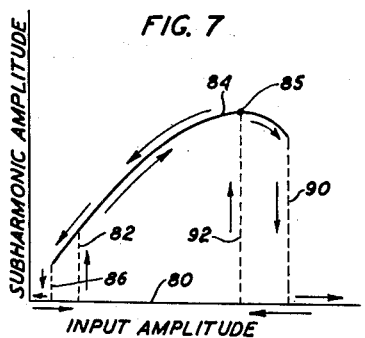
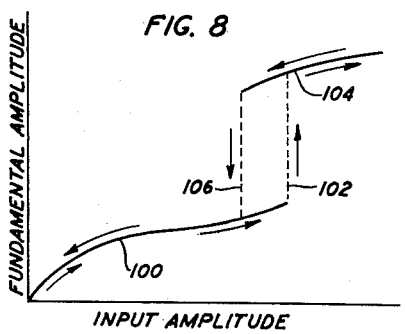
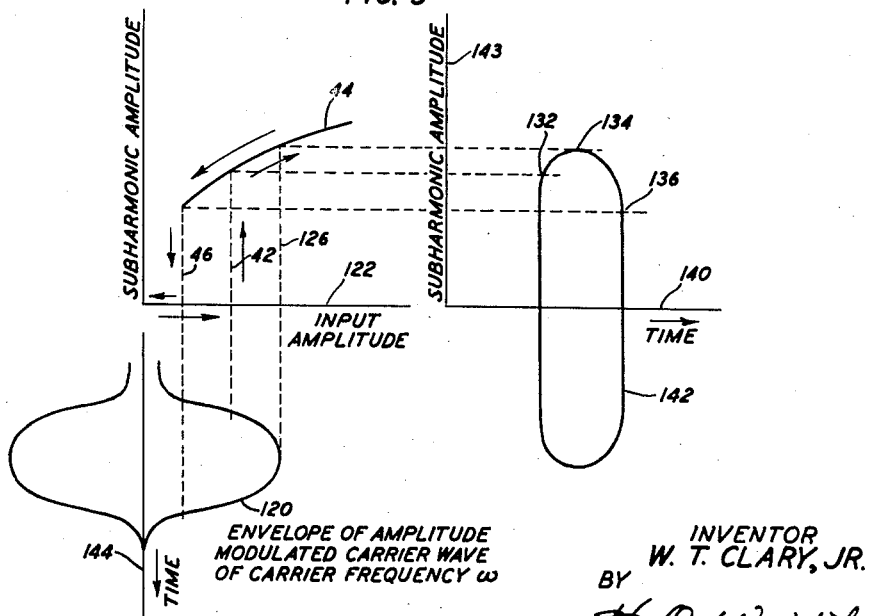
INVENTOR
W. T. CLARY, JR.
BY
ATTORNEY June 10, 1958     W. T. CLARY, JR     2,838,687
NONLINEAR RESONANT CIRCUIT DEVICES
Filed Aug. 9, 1955     3 Sheets-Sheet 3
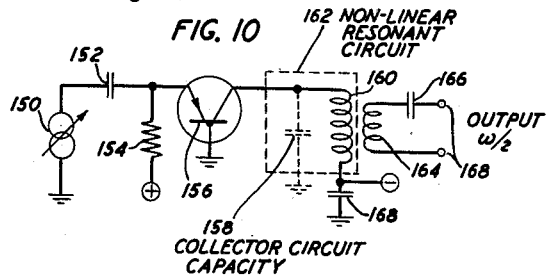
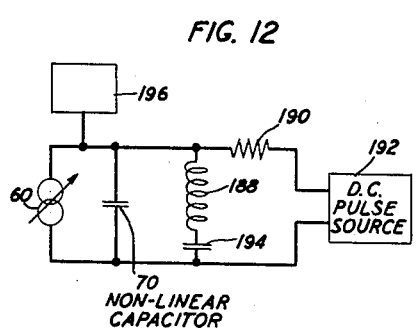
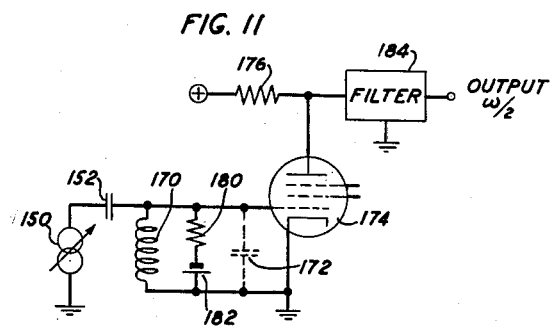
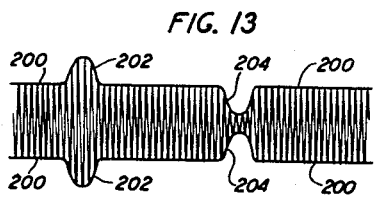
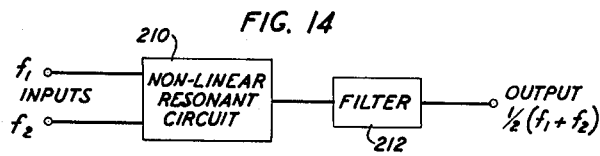
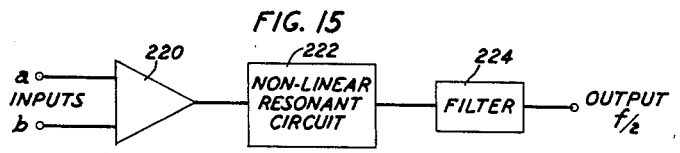
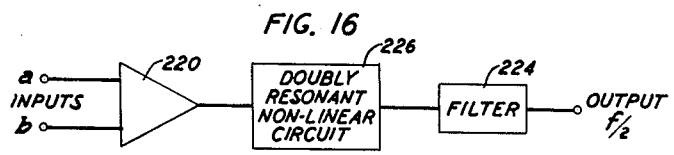
INVENTOR
W. T. CLARY, JR.
BY
H. O. Wright
ATTORNEY United States Patent Office 2,838,687
Patented June 10, 1958

2,838,687

NONLINEAR RESONANT CIRCUIT DEVICES

William T. Clary, Jr., Morristown, N. J., assignor to Bell Telephone Laboratories, Inc., New York, N. Y., a corporation of New York Application August 9, 1955, Serial No. 527,381

7 Claims. (Cl. 307—88)

This invention relates to novel electrical circuits employing nonlinear resonance phenomena and to novel methods of utilizing such phenomena.

If one or more linear reactive elements of a resonant circuit are replaced by nonlinear reactive elements, the resultant nonlinear resonant circuit has in general a quite different response to an exciting force. The nonlinear circuit may possess an output whose principal component is at a frequency other than the input. Also, in general, the response of a nonlinear circuit is not a continuous function of the input signal but may jump discontinuously from one condition to another with a small change in the frequency or the amplitude of the input energy. The existence of jump phenomena in nonlinear resonance and of subharmonic generation by nonlinear resonance has been known for a number of years. Recent developments of new reactive components and increased interest in phenomena potentially useful in switching type circuits and the like provide an increased incentive to explore possible applications for the phenomena of nonlinear resonance.

It is a principal object of the present invention to apply nonlinear resonance phenomena in novel manners and to provide novel circuits making use of such phenomena.

Studies of nonlinear resonance usually divide the subject into sections which treat it according to the relationship of the input frequency to the resonant frequency of the circuit as discussed hereinbelow.

If the driving frequency is such that neither it nor its harmonics are near a multiple or a submultiple of the resonant frequency of the nonlinear circuit, nor is the driving frequency near a sum of two or more resonant frequencies of the circuit, the excitation is designated as nonresonant excitation. Nonresonant conditions are of interest in connection with the present invention only as boundaries of the resonant regions. Except that the input and output amplitudes may have a nonlinear relation, nonresonant, nonlinear circuits are, in general, similar in properties to linear circuits.

In a nonlinear circuit driven by a sinusoidal source whose frequency is near a resonant frequency of the circuit, the amplitude of the circuit response, as a function of input frequency or excitation amplitude, may have abrupt jumps from one state to another. Such jumps usually occur when the input frequencies differ slightly from the resonant frequencies. These jumps may occur at frequencies above or below the resonant frequency depending on whether the reactance of the nonlinear element tends to increase or decrease with the amplitude of its excitation. Typical responses are illustrated in the accompanying drawings and will be discussed in detail hereinunder.

The "hysteresis phenomena" involving noncoincident jumps are encountered, in general, when the overall circuit loss is low, the nonlinearity is sufficiently great and the amplitude of excitation is above a minimum or threshold value.

The existence of the "hysteresis" regions of nonlinear resonant response can be explained intuitively as follows: If the circuit is resonant, a large response exists, while if it is in a nonresonant condition a significantly smaller response will result. For example, if the input frequency is below the natural (small signal) resonant frequency of the nonlinear circuit and the nonlinear reactance tends to decrease if capacitative, or to increase if inductive, with increasing amplitude of the applied signal the circuit response will increase smoothly until the apparent reactance of the nonlinear element has changed sufficiently to bring the circuit into resonance.

Any further increase in the input amplitude will therefore cause an abrupt rise in the response. Once the high response is established, the apparent reactance is such that the circuit is resonant. If the input amplitude is decreased after the resonant state has been established, the response will decrease slowly until the amplitude of the response has decreased to such an extent that the nonlinear reactance is no longer such as to make the circuit resonant. If the input amplitude is decreased still further, the circuit becomes nonresonant and the response returns (jumps) to its lower value.

In general, the inputs required to initiate and to sustain the high current state of nonlinear resonance, respectively, may differ appreciably and there exists a "hysteresis" effect and region, as illustrated in the accompanying drawings and as will be described in detail hereinunder.

If the frequency of an excitation applied to a resonant circuit containing a nonlinear reactance is approximately a multiple of the circuit's resonant frequency, the principal component of the response may be at that submultiple of the input frequency for which the circuit is nearly resonant. Such nonlinear resonant responses are termed subharmonics. Subharmonic resonance is a familiar phenomenon to those skilled in the art. The important property of interest for the purposes of this invention is the manner of variation of the amplitude of the subharmonic response with change in input frequency or with change in the amplitude of excitation. The exact form of response will depend upon the order of the subharmonic and the specific characteristic of the nonlinear element. For example, subharmonics of the third, fourth and higher orders can and do occur but usually they cannot be excited from rest without a transient excitation. Any subharmonic may exist only for a particular range of input amplitudes and there is frequently an upper value of excitation above which the subharmonic is not present In the case of nonlinear circuits which possess two or more resonant frequencies, more complex behavior is to be expected and actually occurs. For example, a nonlinear circuit resonant at one half and one fourth the input frequency will usually possess regions in which the second and fourth order subharmonics, respectively, exist. As a further example, a circuit having a resonance at the exciting frequency and also at one half of that frequency has been found to have a response such that in the region in which the subharmonic exists the response at the exciting frequency changes only slightly. At the upper limit for which the subharmonic exists the subharmonic amplitude drops abruptly to zero and the amplitude at the driving frequency increases abruptly.

A nonlinear circuit resonant at a frequency near a multiple of the exciting frequency may have resonant jump and hysteresis properties quite similar to those at the principal resonance except that the principal response frequency is a multiple of the input or driving frequency. Such harmonic resonances are usually called ultraharmonics. The properties of such circuits are in general substantially the same as for the principal frequency of resonance and are mainly of interest in connection with the generation of higher frequencies from a relatively low input frequency.

Principal uses of the arrangements of the invention, as will be explained in detail below, are for pulse regeneration, information storage and logic operations.

Further objects, features and advantages of the invention will become apparent during the course of the following detailed description of illustrative embodiments of the invention shown in the accompanying drawings in which:

Fig. 6 shows, in schematic diagram form, a doubly resonant circuit embodying an arrangement of the invention;

Fig. 7 is a diagram showing the subharmonic output versus input amplitude for the circuit of Fig. 6;

Fig. 8 is a diagram showing the fundamental frequency output versus input amplitude for the circuit of Fig. 6;

Fig. 9 is a diagram illustrating the use of a circuit of the invention as a pulse regenerating circuit;

Fig. 10 is a diagram illustrating the use of the collector capacity of a transistor in a nonlinear resonant arrangement of the invention;

Fig. 11 is a diagram illustrating the use of the control grid to cathode capacity of a pentode in a nonlinear resonant arrangement of the invention;

Fig. 12 is a diagram illustrating an arrangement of the invention adapted for direct current pulse regeneration;

Fig. 13 is a diagram of a carrier wave upon which control pulses are imposed for control of certain arrangements of the invention;

Fig. 14 is an "and" logic circuit employing an arrangement of the invention;

Fig. 15 is an "or" logic circuit employing an arrangement of the invention; and

Fig. 16 is an "exclusive or" logic circuit employing an arrangement of the invention.

Figure 1:
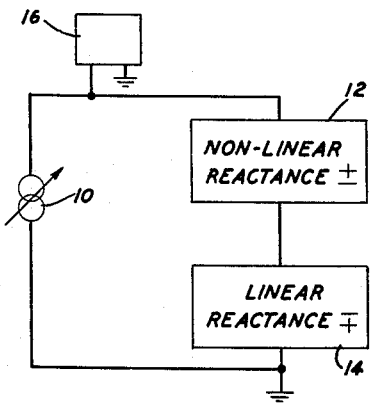
Fig. 1 illustrates, in block schematic diagram form, a simple circuit employed in practicing particular methods of the invention.

In more detail in Fig. 1, element 12 represents a nonlinear reactance element which can, for example, be an iron core inductance coil, a capacity having a ferroelectric dielectric, the control grid to cathode capacity of a pentode vacuum tube, the collector circuit capacity of a transistor, an inductance coil having a ferrite core, or any of a number of other "nonlinear reactance elements" known to those skilled in the art.

Element 14 represents a linear reactance element such as an air-core coil or an air dielectric capacitor and should be inductive if element 12 is capacitative and vice versa, so that the combination of the two elements 12, 14 will have a resonance near the frequency (or, for a varied frequency input, within the frequency region) of the input energy furnished by a source of alternating current 10 across the terminals of which the series combination of elements 12, 14 is connected, as shown. Element 16 represents a utilization circuit in which energy from the main circuit described above may be utilized.

Figure 2:
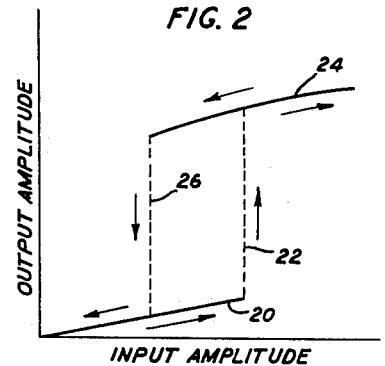
Fig. 2 is a diagram showing the relation of input to output amplitudes for an arrangement of the invention.

Assuming that the driving frequency furnished by source 10 of Fig. 1 is substantially constant and differs slightly from the nominal (or low amplitude) resonance of the combination 12, 14 of Fig. 1 in such a direction that the change in the reactance of nonlinear element 12 with increasing amplitude tends to bring the combination 12, 14 into resonance at the frequency of source 10, then a response of the type indicated in Fig. 2 will be obtained.

With small but increasing amplitude of input from source 10, the response of the combination 12, 14 will at first increase slowly, as indicated by trace 20 of Fig. 2 and the arrow beneath it, until the point at the right end of trace 20 is reached, whereupon the output amplitude or response of combination 12, 14 will suddenly jump, as indicated by broken vertical line 22 and the arrow to its right, to a point on the higher trace 24, as shown. An increase of input amplitude thereafter results in a further moderate increase along trace 24 toward the right as indicated by the arrow beneath trace 24.

Upon slowly decreasing the amplitude of source 10, thereafter, the response of combination 12, 14 follows trace 24 toward the left as indicated by the arrow above it, until the point at the left end of trace 24 is reached, whereupon the response, or output amplitude, suddenly jumps down to the low input trace 20, as indicated by broken line 26 and the arrow to its left. As the amplitude of input from source 10 is further decreased the response, or output amplitude, of combination 12, 14 follows trace 20 toward the left as indicated by the arrow above trace 20, thus completing a cycle.

Figure 3:
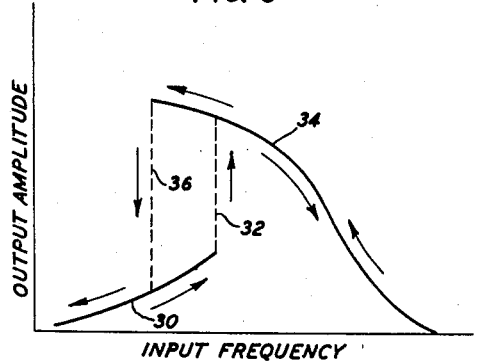
Fig. 3 is a diagram showing the relation of output amplitude to input frequency for an arrangement of the invention.

Another possible response characteristic for the circuit of Fig. 1 is illustrated in Fig. 3. To obtain this response the frequency of the source 10 is varied, at constant amplitude, from a frequency below the low-amplitude resonant frequency of the combination 12, 14 to a frequency well above the resonant frequency. As the frequency increases from a value below the resonant frequency, the response, or output amplitude, at first increases slowly, as illustrated by the curved portion 30 of Fig. 3 and the arrow beneath it, until it reaches the point at the right end of portion 30. At this point the response suddenly jumps to a higher value as indicated by broken vertical line 32. With further increase in frequency the response decreases, following portion 34 toward the right, as indicated by the arrow beneath trace 34, until, at a frequency considerably above that at which jump 32 occurred, the response has fallen to zero. Decreasing the frequency from the higher frequency point of zero response, the response increases along portion 34 as indicated by the arrows above it, until a point appreciably lower in frequency than that at which jump 32 occurred is reached, when the response or output amplitude suddenly jumps down to curve portion 30, as indicated by the broken line 36 and the arrow to its left. As the frequency is still further decreased, the response decreases along curved portion 30 as indicated by the arrow above it, and a cycle is thus completed.

Figure 4:
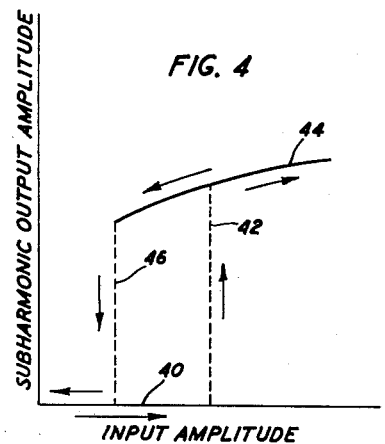
Fig. 4 is a diagram showing the relation of subharmonic output amplitude to input amplitude for an arrangement of the invention.

A still further response or output amplitude characteristic obtainable from the circuit of Fig. 1 is that illustrated in Fig. 4. Fig. 4 indicates the subharmonic response (or output amplitude) at a frequency $\omega/2$ for amplitude variations of an input frequency $\omega$. In this instance the low-amplitude response, or output, is zero as indicated by baseline 40 and the arrow beneath it until at a somewhat increased amplitude a sudden jump to a relatively high value on curved portion 44 of the characteristic takes place, as indicated by the broken vertical line 42 and the arrow to its right. As the input amplitude is further increased the response increases along curved portion 44, as indicated by the arrow beneath it. When the input amplitude is now decreased, the response decreases along curved portion 44, as indicated by the arrow above it, until jump 46 takes place, at an amplitude appreciably less than that at which jump 42 occurred. Jump 46 carries the response back to zero as shown and indicated by the arrows to its left and the cycle is thus completed. Where the output or response of interest is at the subharmonic frequency $\omega/2$, as in the instance just described, the utilization circuit 16 preferably includes a filter or a tuned input circuit tuned to ω/2.

Figure 5:
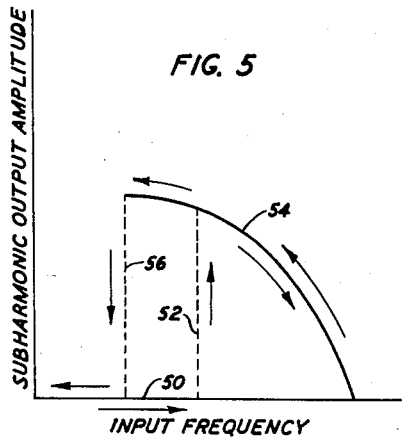
Fig. 5 is a diagram showing the relation of subharmonic output amplitude to input frequency for an arrangement of the invention.

In Fig. 5 the response, or output amplitude, at ω/2 (subharmonic) versus input frequency, variable about a mid-frequency ω, is shown, and the cycle is traced along baseline 50 at zero until jump 52 to trace 54 occurs, then along trace 54 to the right until the response or output amplitude again reaches zero, after which, decreasing the frequency results in an increasing output along trace 54, to the left, until jump 56 back to baseline 50 (zero output) takes place and the cycle is completed.

The response characteristics of Figs. 4 and 5 at ω/2, i. e., at a subharmonic of the driving frequency, have the frequently advantageous feature that their responses are zero when operating below resonance, whereas at the driving frequency, as exemplified by Figs. 2 and 3, a small but appreciable response is present below resonance.

In Fig. 6, a doubly resonant circuit, comprising nonlinear element 70, which is indicated as a nonlinear capacitor, together with linear inductors 72, 76 and liner capacitor 74, is shown. Elements 74, 76 are connected in parallel, element 72 being connected in series with the parallel combination 74, 76 and these three linear elements, connected as just described, being connected in shunt across nonlinear element 70, as shown.

Capacitor 70 may be a conventional capacitor except that its dielectric material is of a ferroelectric material such as barium titanate, potassium, niobate, guanadinium aluminum sulphate hexyhydrate, or the like. Alternatively, at microwave frequencies, the capacity of a transistor collector circuit or that of the input to a pentode vacuum tube may be used.

For purposes of illustration, it will be assumed that the combination of inductors and capacitors just described has resonant frequencies at substantially $f_1=\omega$ and $f_2=\omega/2$.

It will further be assumed, for purposes of illustration, that constant current source 60 is a source of frequency $f_1$ the amplitude of which can be varied over a wide range.

A pair of band pass filters 62 and 64, the first passing frequency $f_1$ and the second passing frequency $f_2$, respectively, have their common input connected to the lead connecting source 60 and the reactive network 70, 72, 74, 76, as shown. For the present circuit, it is further preferable that these filters absorb a relatively small amount of power from the overall circuit.

As the amplitude of source 60 is increased from a low to a relatively high amplitude and then decreased over substantially the same range of amplitudes, the responses at the outputs of filters 64 and 62 will be as illustrated in Figs. 7 and 8, respectively.

In Fig. 7, starting with a low amplitude, no output at the frequency ω/2 will be detected until a critical amplitude is reached at which a sudden jump 82 to the curve 84 takes place. With further increase in amplitude, the output at frequency ω/2 increases to a maximum at point 85 beyond which, with further increase in amplitude, it begins to decrease and at a second critical point it jumps to zero as indicated by broken line 90, and remains zero for any further increase in input amplitude. If the input amplitude is then decreased, the output at frequency ω/2 remains zero until a third critical value is reached at which it jumps up to point 85 on curve 84 as indicated by broken line 92 and then decreases along curve 84 with decreasing amplitude until at a fourth critical value (below the above-mentioned first critical value) a jump 86 back to zero takes place, the cycle being thus completed.

Turning now to Fig. 8, the output of filter 62, at the driving (or fundamental) frequency ω, increases slowly along curve 100 until at a critical value a jump 102 occurs to the higher curve 104. With further increase in input amplitude, the output of filter 62 increases along curve 104. If then the input amplitude is decreased, the output of filter 62 decreases along curve 104 until at a second critical value a jump 106 back to curve 100 takes place at an amplitude appreciably below that at which jump 102 occurred. Further decrease in input amplitude carries the output of filter 62 toward zero along curve 100 to complete the cycle.

A curious phenomenon interrelating the responses or outputs of filters 62 and 64, as shown in Figs. 7 and 8, respectively, is that jump 102 of Fig. 8 occurs at the same critical amplitude value as jump 90 of Fig. 7 and likewise jump 106 of Fig. 8 occurs at the same critical amplitude value as jump 92 of Fig. 7, indicating that the fundamental frequency "takes over" and "relinquishes control," respectively, at these points, the response at ω/2 being zero when the response at ω is on the higher curve 104 of Fig. 8. Obviously such a pair of characteristics makes possible numerous and varied switching by amplitude control arrangements, since, above a particular amplitude for an increasing amplitude input the output of filter 64 becomes zero and that of filter 62 jumps to a considerably greater amplitude, while for a decreasing amplitude input, the reverse conditions are established.

Fig. 9 indicates diagrammatically a method of pulse regeneration based upon the use of a subharmonic response such, for example, as that illustrated in Fig. 4 and described in detail hereinabove.

In a circuit arrangement to practice this method, the source 10 of Fig. 1 can be considered a source of amplitude-modulated carrier wave pulses of frequency ω of the general type illustrated by pulse 120 of Fig. 9. When pulse 120 reaches the critical amplitude value corresponding to jump 42, of Figs. 4 and 9, an output response at the subharmonic frequency ω/2 is initiated and as the pulse amplitude still further increases, this output will follow curve 44 to the right. As the pulse amplitude then decreases the response at frequency ω/2 will follow curve 44 to the left until the critical amplitude at which jump 46 to zero value is reached, when the output at the subharmonic frequency ω/2 will, of course, become zero. The regenerated pulse 142 at the subharmonic frequency ω/2 will then be as illustrated at the upper right in Fig. 9. The regenerated pulse starts abruptly at an amplitude represented by point 132, increases slightly in amplitude to point 134 and then decreases in amplitude and is terminated abruptly at point 136. By comparison with the input pulse 120, the output pulse 142 is very appreciably sharpened or "regenerated" and can be taken from the output of a band pass filter, included in utilization circuit 16 of Fig. 1, designed to pass the frequency ω/2. Such a filter is indicated as filter 64 of Fig. 6. The advantage of using the subharmonic response, namely that the output is zero except during the active regeneration process, is well illustrated by this particular application.

In Fig. 10, a further circuit of the invention of the general type exemplified by Fig. 1 is shown in which the specific nonlinear reactance comprises the collector circuit capacity 158 of a junction transistor 156. Alternatively, a junction diode could be substituted for the transistor but the latter has the advantage that its emitter provides a convenient electrode for introducing the carrier, and under suitable conditions well known to those skilled in the art, it can provide some circuit gain. The circuit of Fig. 10 has the very real advantage that it can operate with a very high driving carrier frequency from source 150. By way of example, frequencies as high as 50 megacycles can be employed. Obviously, this represents a very substantial extension above the highest frequency range at which ferroelectric or ferromagnetic nonlinear devices can operate satisfactorily.

In Fig. 10 the source of carrier frequency 150 is connected through blocking condenser 152 to the emitter of transistor 156, the base of which transistor is grounded. The emitter is suitably biased through isolating resistor 154 which is connected at its lower end to the positive terminal of a direct current source (not shown), the negative terminal of which source is grounded. The collector electrode of transistor 156 is connected through inductor 160 to the negative terminal of a direct current source (not shown), the positive terminal of which source is grounded, thus biasing the collector in the reverse direction to that of the emitter. A bypass condenser 168 is shunted across said last-mentioned direct current source to provide a high frequency path to ground.

An inductor 164 is weakly coupled to inductor 160 and the output circuit includes a capacitor 166, the combination of inductance 164 and capacitor 166 being tuned to the desired subharmonic output frequency $\omega/2$. A suitable utilization circuit can then be connected to output terminals 168.

Inductor 160 and collector capacity 158 constitute a nonlinear resonant circuit, the low-signal resonance of which is, by way of example, appropriately adjusted with respect to the carrier frequency $f$ from source 150, so as to be located at the half frequency subharmonic $\omega/2$ of said carrier frequency. The output responses of the circuit of Fig. 10 will then be of the character indicated in Figs. 4 and 5, with suitable input energy supplied from source 150 as required for these responses, respectively.

In Fig. 11 a further circuit of the invention adapted for use at much higher frequencies than are circuits employing ferroelectric or ferromagnetic nonlinear elements is shown. In the circuit of Fig. 11 the nonlinear element is the control grid to cathode capacitance 172 of a pentode vacuum tube 174. A source of direct current bias 182 is connected through an isolating resistor 180 to establish an appropriate grid-to-cathode current so that the input capacitance is in a desired nonlinear region. The bias is such as to place the tube operating point about midway between its cutoff and zero bias conditions. Inductor 170 is then shunted across the control grid to cathode circuit to render the nonlinear combination of this inductor and capacity 172 resonant at the subharmonic frequency $\omega/2$ which is one half of the carrier frequency $f$ provided by source 150 through blocking capacitor 152.

Suitable anode potential is supplied through isolating resistor 176 to the anode of vacuum tube 174, the left terminal of resistor 176 being connected to the positive terminal of an appropriate direct current supply source (not shown), the negative terminal of said source being grounded. A filter 184 passing the frequency $\omega/2$ is connected to the anode circuit of tube 174 as shown, from which a response at the frequency $\omega/2$ having the characteristic of either Fig. 4 or Fig. 5, dependent upon suitable input energy being supplied from source 150, as required for these responses, respectively, in connection with the generic type of circuit illustrated in Fig. 1.

In Fig. 12 a circuit substantially the same as that of Fig. 1, including constant current source 60, nonlinear capacity 70, and linear inductor 188, substantially as described for Fig. 1, is shown. A large blocking condenser 194 has been added to prevent the passage of direct current through coil 188 and a source of substantially square wave direct current pulses 192 has been connected through an isolating resistor 190 to provide for biasing the nonlinear capacitor 70 during the application of the direct current pulses from said source 192. Considering the response characteristic shown in Fig. 4 for the circuit of Fig. 1, then in the circuit of Fig. 12 if the response at $\omega/2$ (one half the input frequency from source 60) is initially zero, the introduction of a direct current pulse of suitable amplitude from source 192 will raise the response at $\omega/2$ to a point well up on trace 44. At the end of the direct current pulse from source 192 the response will again drop to zero. Utilization circuit 196 will preferably include a filter selecting the frequency $\omega/2$ so that a carrier frequency pulse at that frequency will be received by the utilization circuit during the application of each direct current pulse from source 192. These pulses can, of course, be rectified if regenerated direct current pulses are desired for use in the utilization circuit 196.

In Fig. 13, a carrier control wave of frequency $\omega$ and of substantially constant normal amplitude 200, except for a pulse of increased amplitude 202 and a pulse of decreased amplitude 204, is represented. Numerous forms of carrier wave generators capable of generating such a wave having a normal predetermined amplitude carrier wave with pulses of increased or decreased amplitude occurring at any desired instants are well known to those skilled in the art.

Assuming, by way of example, that generator 10 of Fig. 1 is such a generator and considering, by way of example, the response characteristic of the circuit of Fig. 1, shown in Fig. 4, if the normal amplitude of the carrier wave is substantially midway between the jump amplitudes 46 and 42 and the circuit has not been excited into resonance, there will be no output response at frequency $\omega/2$ in utilization circuit 16. However, when the carrier wave is pulsed to increased amplitude as represented by pulse 202 of Fig. 13, the amplitude will be increased beyond the value at which jump 42 to resonance occurs and upon the cessation of the pulse the normal carrier 200 still being present, at an amplitude substantially midway between the positions of jumps 42 and 46 of Fig. 4, the circuit will continue to be resonant and output at frequency $\omega/2$ will continue to be received by utilization circuit 16. In other words, the circuit "remembers" that it has received the positive or increased pulse of carrier. This "memory" can, obviously, be cleared by subsequently imposing a "negative pulse" or pulse of decreased amplitude as represented by pulse 204 of Fig. 13 sufficient to carry the circuit below jump point 46 whereupon the resumption of normal amplitude 200 by the carrier wave will result in no further output at frequency $\omega/2$ in utilization circuit 16, until a subsequent positive pulse, or pulse of increased carrier, is provided.

Obviously, any of the responses of Figs. 2 through 5, 7 or 8, can be employed with an appropriately controlled input wave to furnish "memory" units of the general character just described in detail above. The responses of Figs. 3 and 5, of course, require that the control wave be appropriately varied in frequency to produce the establishment and erasure of the "memory" oscillation, while the remainder are all amplitude operated responses.

In Fig. 14 an arrangement of the invention suitable for use as an "and" logic unit is shown.

The nonlinear resonant circuit is made resonant near the subharmonic frequency $$\frac{f_1+f_2}{2}$$

of the combined input frequencies $f_1$ and $f_2$, and filter 212 forming the input to a utilization circuit is tuned to this subharmonic frequency $$\frac{f_1+f_2}{2}$$

Obviously, if both input frequencies $f_1$ and $f_2$ are present in appropriate amplitudes, the output of the nonlinear circuit will have a component subharmonic of frequency $$\frac{f_1+f_2}{2}$$

but if either $f_1$ or $f_2$ is not present there will be no output component of said subharmonic frequency. The arrangement of Fig. 14 is accordingly an "and" logic unit.

In Fig. 15 is shown an arrangement of the invention suitable for use as a conventional "or" logic unit as distinguished from an "exclusive or" logic unit such as will be described in connection with Fig. 16.

A conventional "or" logic unit is a unit which responds with an output signal if either one or both of two input circuits are energized.

An "exclusive or" logic unit is a unit which responds with an output signal if either one or the other of two input circuits is energized but does not respond if both inputs are energized.

For a conventional "or" logic unit, the input signals $a$ and $b$ are, when, as and if present, both carrier signals of frequency $f$ and when both are present they are in phase.

Amplifier 220 serves to appropriately amplify one or both of the input signals and nonlinear resonant circuit 222 is operated to obtain the response characteristic at the subharmonic frequency of substantially $f/2$, as represented by Fig. 4 described in detail above. Either input alone is of sufficient amplitude to drive the nonlinear unit to the resonant condition so that if either input or both inputs are present a response at the subharmonic frequency $f/2$ will appear in the output and be passed by output filter 224.

In Fig. 16 an "exclusive or" logic unit is shown. The nonlinear resonant circuit for this unit is operated in accordance with the response characteristic represented by Fig. 7, the doubly resonant type of circuit illustrated in Fig. 6 being employed as the nonlinear resonant circuit. The inputs $a$ and $b$ are each of the input frequency $f_1$ and of sufficient amplitude that either input alone will drive the nonlinear unit to a resonant condition intermediate jumps 82 and 92 of Fig. 7. An output response of frequency $f_1/2$ will accordingly appear in the output and be passed by filter 224 if either input is present. However, if both inputs are present the nonlinear unit is driven to a point beyond jump 90 which is above the amplitude for which the response at the subharmonic frequency $f/2$ has fallen to zero, as shown in Fig. 7, so that with both inputs present, no output response will be present.

The above-described arrangements are illustrative of the extremely broad range and scope of the present invention but, obviously, by no means exhaustively illustrate the full possibilities in the application of the principles thereof. Numerous and varied other arrangements and applications within the spirit and scope of the invention will readily occur to those skilled in the art.

What is claimed is:

1. In combination, a nonlinear resonant circuit having a response characteristic which includes a "hysteresis" area above which the circuit must be driven to establish resonance from a nonresonant condition and below which the circuit must be driven to extinguish an existing resonant state of said circuit, a source of energy having a frequency which is substantially a multiple of the frequency of a resonance of said nonlinear circuit, said source being connected to said circuit and being variable over a range including said "hysteresis" area, and utilization means coupled to said circuit, said utilization means including frequency selective means tuned to the subharmonic resonant frequency of said nonlinear circuit, whereby the response of said circuit over said range may be utilized.

2. The combination of claim 1 in which said response characteristic is dependent upon amplitude variation of said input source over a predetermined range.

3. The combination of claim 1 in which said response characteristic is dependent upon frequency variation of said input source over a predetermined range.

4. The combination of claim 1 in which said circuit has a plurality of resonances.

5. In combination, a nonlinear resonant circuit having a response characteristic which includes a "hysteresis" area above which the circuit must be driven to establish resonance from a nonresonant condition and below which it must be driven to extinguish an existing resonant state, a source of driving energy having a frequency which is substantially a multiple of the frequency of a resonance of said nonlinear circuit, said source being connected to said circuit and having a normal output value intermediate the extremes of said "hysteresis" area, utilization means connected to said circuit, said utilization means including frequency selective means tuned to the subharmonic resonant frequency of said nonlinear circuit, and means for momentarily increasing or decreasing the said normal value of said source to a point outside said hysteresis area whereby when said circuit is nonresonant and said driving source output is momentarily increased the circuit will become and remain resonant and when resonant and said driving source output is momentarily decreased said circuit will become and remain nonresonant.

6. The combination of claim 5 in which the frequency of said driving source is substantially constant and the momentary increase or decrease of said signal is in amplitude.

7. In combination a doubly resonant nonlinear circuit having resonances at frequencies of $f_1$ and $f_1/2$, a source of input energy at frequency $f_1$ connected to said circuit, the amplitude of said circuit output being adjustable over a sufficient range to induce cycles of resonance in said circuit at both of its resonant frequencies and utilization means connected to said circuit, said utilization means including two filters tuned respectively to the frequencies $f_1$ and $f_1/2$ whereby over a particular portion of the amplitude range of said source an output signal will be received from only one of said filters and over a particular different portion of said amplitude range of said source a substantial output signal will be received from the other of said filters only.

References Cited in the file of this patent
UNITED STATES PATENTS

| | | |
|---|---|---|
| 1,725,022 | Stacy et al. | Aug. 20, 1929 |
| 2,653,254 | Spitzer et al. | Sept. 22, 1953 |
| 2,697,178 | Isborn | Dec. 14, 1954 |